United States Patent [19]
Popplewell

[11] 4,182,399
[45] Jan. 8, 1980

[54] PROCESS FOR REMOVING HEAVY METAL IONS FROM AQUEOUS FLUIDS

[75] Inventor: James M. Popplewell, Guilford, Conn.

[73] Assignee: Olin Corporation, New Haven, Conn.

[21] Appl. No.: 851,700

[22] Filed: Nov. 15, 1977

[51] Int. Cl.$^2$ .......................... F28F 19/00; F28F 3/14
[52] U.S. Cl. ........................................ 165/1; 165/133; 165/134 R; 165/170; 165/180; 210/36; 210/38 B
[58] Field of Search ............ 165/1, 133, 134, DIG. 8, 165/170, 180; 210/36, 38 B

[56] References Cited

U.S. PATENT DOCUMENTS

| | | | |
|---|---|---|---|
| 2,469,828 | 5/1949 | Johnson | 29/157.3 V |
| 3,601,884 | 8/1971 | Kemeny | 228/220 |
| 3,650,005 | 3/1972 | Kamiya et al. | 29/157.3 V |
| 3,994,753 | 11/1976 | Kanal et al. | 148/22 |
| 4,021,901 | 5/1977 | Kleine et al. | 113/118 V |

FOREIGN PATENT DOCUMENTS

| | | | |
|---|---|---|---|
| 1109859 | 6/1961 | Fed. Rep. of Germany | 165/134 |
| 51-25467 | 2/1976 | Japan | 228/118 |

Primary Examiner—Sheldon Jay Richter
Attorney, Agent, or Firm—Victor A. DiPalma; Paul Weinstein

[57] ABSTRACT

The invention relates to an improved method for removing corrosive heavy metal ions from aqueous fluids used in heat exchange systems. The method provides for the employment of a getter upstream of a heat exchange and in proximate contact therewith so that the getter removes said ions from said fluid before the fluid is introduced into the heat exchanger.

13 Claims, 5 Drawing Figures

PROCESS FOR REMOVING HEAVY METAL IONS FROM AQUEOUS FLUIDS

CROSS REFERENCE TO RELATED APPLICATIONS

U.S. patent applications Ser. Nos. 851,699 for "IMPROVED SOLAR ENERGY COLLECTOR SYSTEM" by James M. Popplewell, filed Nov. 15, 1977, and 851,112 for "METHOD OF MANUFACTURING GETTERS" by James M. Popplewell, filed Nov. 14, 1977, both assigned to the assignee of the present invention.

BACKGROUND OF THE INVENTION

The present invention relates to an improved getter panel for use in a heat exchange system utilizing aqueous fluids.

Aluminum and its alloys have been used extensively for the construction of solar absorber panels, heat exchangers and the like due to its strength, light weight and ease of fabrication. One known method for producing tube in sheet absorber panels etc., is the ROLL-BOND ® method, disclosed in U.S. Pat. No. 2,690,002. ROLL-BOND ® is a registered Trademark of Olin Corporation. Two aluminum sheets are welded together by hot rolling with a pattern of stop weld material disposed between the sheets. High pressure fluid is then introduced between the portions of the sheets which have not been bonded together due to the presence of the stop weld material so as to distend the non-bonded portions into a tubular form.

Panels made in the aforesaid manner are used extensively as heat exchangers in heat exchange systems. However, in heat exchange systems using aqueous heat transfer fluids, corrosion is often a problem. This is particularly true in multi-metal systems containing heavy metals such as copper and iron which are often used in systems to make pipes, storage tanks, auxiliary heat exchangers and the like. Heavy metal ions will be present in aqueous heat exchange fluid due to the normal corrosion of the aforesaid elements in the heat exchange system. Since the electrode potential of aluminum is lower than that of the heavy metal, plating out of the heavy metals on cathodic areas of the aluminum panels results in the formation of local galvanic cells. Such cells promote rapid "pitting" or "pinholing" of the aluminum panels with the end result being leakage.

In order to prevent corrosion of the aluminum heat exchangers used in the heat exchange system, it has been known to provide the inner surface of the passageways with an oxide coating. However, this method has not been found satisfactory in completely precluding pitting corrosion. Another method used to produce aluminum panels was to clad an aluminum-zinc alloy sheet to a core sheet of an aluminum alloy and then join two such prepared sheets together. In such a system, the core sheet of aluminum is protected by sacrifice of the aluminum-zinc alloy cladding. Such a method has been found to be complex and costly due to the fact the two sheets must be bonded together before roll bonding. More importantly, since it was necessary for the sacrificial aluminum-zinc alloy to be on the inner surfaces, corrosion occurred at the bonded portions thereby resulting in penetration down the bonded interface and leakage of the heat transfer fluid. Protective claddings also only provide limited protection since they are consumed by corrosion leaving an unprotected core surface.

Another known method of producing tube in sheet panels is disclosed in U.S. Pat. No. 3,650,005. In this case, two aluminum sheets are welded together by hot rolling with a pattern of zinc or zinc alloy mixed with a solvent and a known stop weld material containing graphite disposed between the sheets. The sheets are then annealed and the zinc or zinc alloy is diffused into the interior of the aluminum to form an aluminum-zinc alloy layer. This method has been found to be ineffective since graphite, which is a strong cathodic depolarizer, causes electro-chemical corrosion in contact with aluminum in the presence of water.

While some non-corrosive stop weld materials have been produced which are free of graphite, such as that disclosed in U.S. Pat. No. 3,994,753, it is clear that it would be of considerable advantage and highly desirable to remove the heavy metal ions from the heat exchange fluid as aforesaid before they come into contact with the aluminum solar panels or the like.

Accordingly, it is a principal object of the present invention to provide a method for removing corrosive elements particularly heavy metal ions from a heat exchange system.

In is a particular object of the present invention to provide a "getter" in heat exchange system.

It is still a further object of the present invention to provide improvements as aforesaid which are inexpensive to utilize.

Further objects and advantages of the present invention will appear hereinbelow.

SUMMARY OF THE INVENTION

In accordance with the present invention, it has been found that the foregoing objects and advantages may be readily obtained.

The present invention provides a highly efficient method and apparatus for removing corrosive heavy metal ions thereby increasing the effective life of the aluminum components of the heat exchange system.

In accordance with the method of present invention, a heat exchange system is provided with a getter component located upstream of the aluminum heat exchanger to thereby remove corrosive heavy metal ions from the heat exchange fluid prior to contact with the aluminum component. The getter component of the present invention is readily inserted into and removed from the heat exchange system thereby allowing easy replacement of the getter component on a periodic basis. The replacement of the getter component is necessary due to corrosion thereof by the heavy metal ions extracted from the heat exchange fluid.

The improved heat exchange system of the present invention employs a getter component wherein the internal surfaces of the getter contains a layer a material which is a highly effective getter for heavy metal ions. The present invention provides for getters which are designed to provide a high degree of turbulence in the heat exchange fluid flow thereby achieving maximum getter efficiency. The getter components are easily manufactured and readily replaceable in the heat exchange system.

The present invention provides considerable advantages over known heat exchange systems. For example, the use of a getter in the system substantially reduces the corrosion of the aluminum heat exchangers used in the system. In accordance with preferred embodiment of the present invention when a getter whose internal surfaces are plated with a layer of material which is a highly effective heavy metal ion getter, extremely high getter efficiencies are obtained and these efficiencies are obtained utilizing a disposable, easily manufactured getter component which can be easily and conveniently inserted and removed from the heat exchange system.

DETAILED DESCRIPTION

In accordance with the present invention, the foregoing objects and advantages can be readily obtained.

Figure 5:
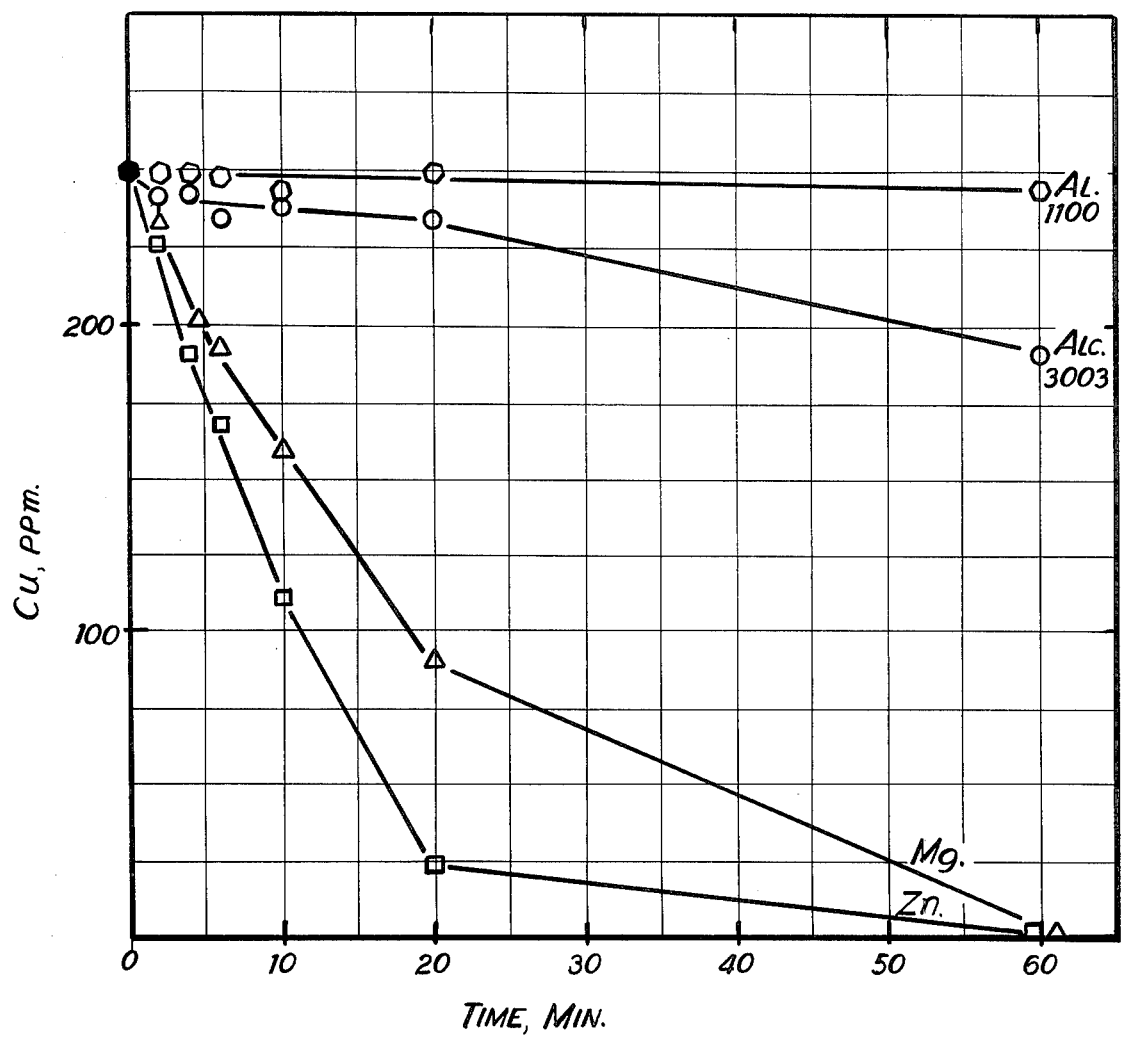
FIG. 5 is a graph comparing the effective gettering ability of various metals for heavy metal ions.

The invention is broadly applicable to the preparation of getters for use in heat exchange systems but is particularly applicable for the formation of getters in accordance with the ROLL-BOND ® process of the aforementioned U.S. Pat. No. 2,690,002, incorporated herein by reference and assigned to the assignee of the instant invention. As is evident from the foregoing discussion of the corrosion of aluminum absorber panels in heat exchange systems, aluminum is a fairly effective getter metal for heavy metal ions. However, in light of the present invention, it is desirable to make the getters for use in heat exchange systems out of materials which evidence gettering ability superior to that of the aluminum solar panels used in said systems. As a result, samples of zinc, magnesium, 1100 aluminum and alclad 3003 were exposed to an aqueous solution of $CuSO_4$ containing 250 ppm copper to determine their effective getter ability. The solution volume to metal surface area ratio was maintained at 10.4 mls. solution/in.$^2$ of metal. The copper concentration in the solution was monitored as a function of time at 25° C. up to one hour. The results of these tests are shown in FIG. 5. Clearly, as can be seen from FIG. 5, zinc has the best getter ability followed by magnesium with alclad 3003 and 1100 aluminum showing far inferior results. The same experiment was repeated at a temperature of 99° C. to simulate high temperature usage which would occur in heat exchange systems. Again, excellent gettering ability was noted for zinc followed by magnesium with both alclad 3003 and 1100 aluminum far behind. These results clearly show that zinc and magnesium are far more efficient in extracting copper ions from an aqueous solution than aluminum.

Figure 1:
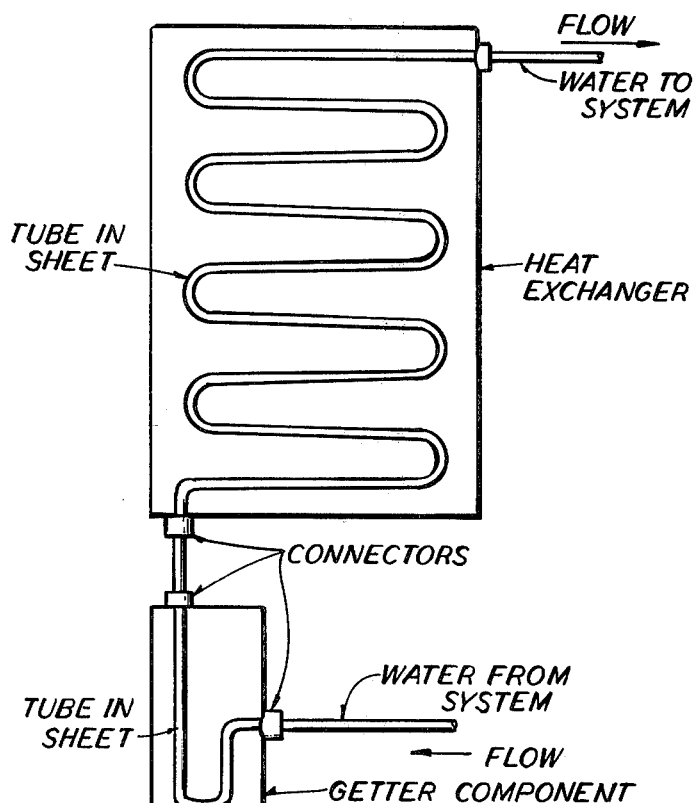
FIG. 1 is a schematic representation of a typical tube in sheet solar absorber panel used in a heat exchange system utilizing the getter component of the present invention.

While the present invention contemplates the employment of getters manufactured by the ROLL-BOND ® process, it should be appreciated that other getter designs may be employed such as simple tubing, etc. FIG. 1 is a schematic representation of a typical getter panel manufactured by the ROLL-BOND ® process employed in a heat exchange system in accordance with the present invention. Since zinc, as pointed out above, is far superior as a getter material in extracting copper ions from an aqueous solution than aluminum, it would be highly desirous to be able to manufacture getter panels by the ROLL-BOND ® process which has a surface layer of zinc to act as a getter.

The present invention will be more readily understood from a consideration of the following illustrative examples.

EXAMPLE I

A non-corrosive stop weld composition composed of 20.65% $TiO_2$, 9.18% boron nitride, 7.87% glycerine, 1.84% bentonite, 1.57% $NH_3$, 0.79% santacell, 0.39% benegal and the balance water was made up. An addition of 25% by weight zinc powder was added to the above non-corrosive stop weld. The viscosity of the stop weld was adjusted by adding an additional 500 grams $H_2O$ and 100 grams glycerine. The stop weld material was printed in the desired serpentine design illustrated in FIG. 2 on an 1100 aluminum alloy sheet. Another 1100 aluminum alloy sheet. Another 1100 aluminum alloy sheet was placed over the printed surface. A serpentine panel was then fabricated in accordance with the ROLL-BOND ® process as set forth in aforementioned U.S. Pat. No. 2,690,002. The panel was then sectioned for analysis. It was found that a surface layer containing 19% zinc was present and well adhered to the aluminum. In addition, it was observed that diffusion had occurred into the aluminum metal thereby producing a zinc enriched layer about 10 Angstroms deep with the zinc level decreasing from the surface inwards. The presence of zinc on the aluminum surface would provide good gettering capabilities while providing a galvanically active layer which would protect the aluminum from pitting thereby extending the useful life of the getter.

EXAMPLE II

Samples were made in the same manner as in Example I except that prior to inflation diffusion anneals were performed at 800° F. for times of ½, 1 and 2 hours. The samples were then sectioned for analysis. The sample which was subjected to a ½ hour anneal showed a surface layer containing 5.1% zinc, with the zinc level decreasing to 0 at a depth of 25 Angstroms. The sample which was annealed for 1 hour had a surface layer 3.8% zinc with a depth similar to that of the sample which was annealed for ½ hour. After a 2 hour diffusion anneal, the surface layer of zinc was 3.6% while the depth of zinc diffusion was increased to 40 Angstroms. The effect of the diffusion anneal as shown in the above examples is to produce a layer of essentially aluminum-zinc alloy on the surface of the panel. While the gettering ability of the aluminum-zinc alloy surface would be slightly less efficient that those panels in which no diffusion anneal is performed, they will be provided with better galvanic protection of the aluminum subsurface due to the greater depth of penetration obtained as a result of the diffusion anneal.

It should be noted that the above examples are only illustrative of the present invention and that this invention contemplates non-corrosive stop weld compositions containing from about 10–80% $TiO_2$, 8–75% boron nitride, 2–20% glycerine, 1–5% bentonite, 0–5% $NH_3$, 0.5–5% santacell, 0.1–3% benegal, 5–50% zinc powder and balance $H_2O$. Furthermore, cadmium dust and 10–90% Al-Zn alloy dust may be substituted for the Zn dust in the above noted stop weld compositions. In addition, it should be noted that a graphite or molybdenum disulfide stop weld may be substituted for the non-corrosive stop weld in the above examples since corrosion resistance is not absolutely mandatory for a disposable getter. Furthermore, Mg or Al-Mg containing stop weld materials may be substituted for the above-noted zinc stop weld materials. However, it should be noted that a magnesium addition will require heating in a reducing atmosphere and therefore is not compatible with the ROLL-BOND ® process. As noted above, this invention is not limited to ROLL-BOND ® panels, but can apply to any known method of manufacturing tubes, etc., for use as a getter. It should also be appreciated that a zinc or magnesium surface may be applied to the aluminum surface by brushing, painting, plating, spraying or the like. However, in such cases a diffusion anneal will be mandatory since the layer of zinc or magnesium will not be well adhered to the aluminum.

Figure 4:
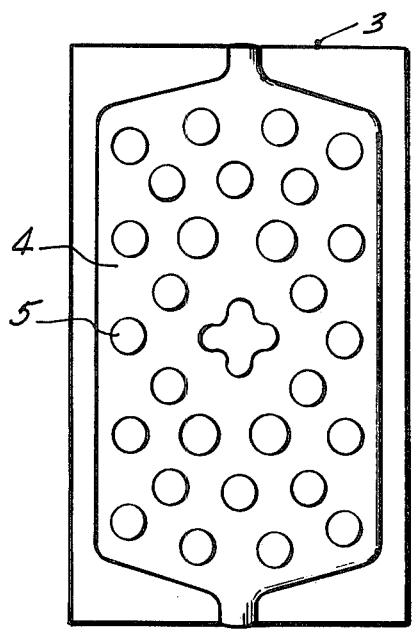
FIG. 4 represents a third embodiment of getter designs of the present invention.
Figure 3:
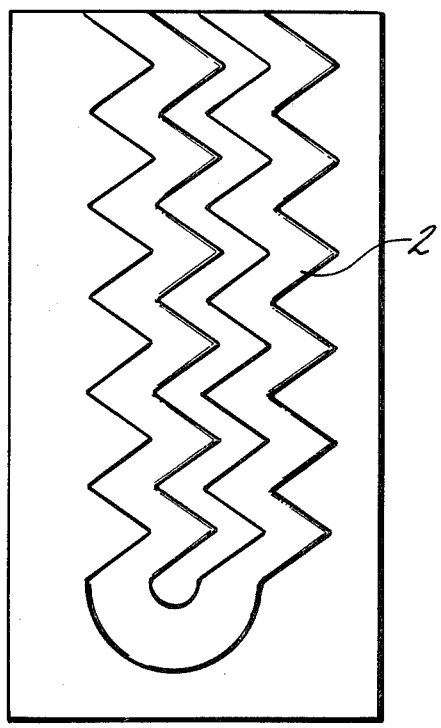
FIG. 3 represents a second embodiment of getter designs of the present invention.
Figure 2:
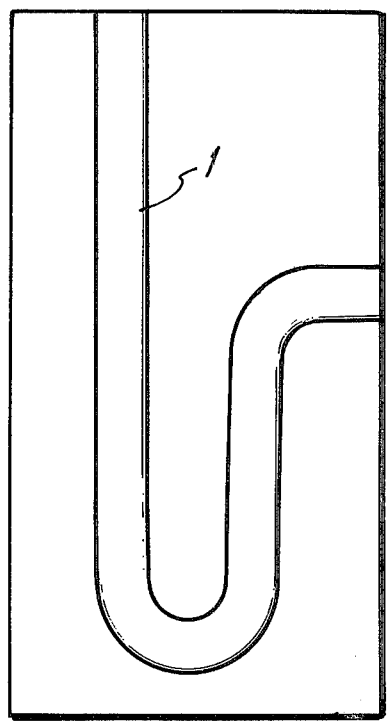
FIG. 2 represents one embodiment of getter components of the present invention.

FIGS. 2-4 represent panel designs to be used as getters in accordance with the present invention. It is important that the designs of the panels provide a high degree of turbulence and non-uniform flow conditions so as to achieve maximum contact of the aqueous solution with the surface area of the panels. Such designs will achieve superior gettering efficiencies than would otherwise be experienced.

FIG. 2 represents one embodiment of a getter design manufactured by the ROLL-BOND ® process in which the passageway 1 is of serpentine design.

FIG. 3 is representative of a second design embodiment in which the passageway 2 is of a zigzag configuration which would provide a high degree of turbulent flow thereby increasing the getter efficiency of the panel.

FIG. 4 represents a third design embodiment of a getter panel manufactured by the ROLL-BOND ® process. Referring to FIG. 4 the getter panel 3 comprises a unitary expanse of unbonded area 4 which is broken up by a symmetrical pattern of bonded portions 5. The bonded portions 5 effectively break up fluid flow thereby permitting efficient fluid contact with the getter surface. It should be noted that the bonded portions 5 may take any shape which would inherently increase turbulent flow of the fluid through the panel, such as cloverleaf, square, etc.

As noted above, the particular getter panel design may be achieved when manufacturing the panels by the ROLL-BOND ® process.

FIG. 1 is a schematic illustration of a getter panel employed in heat exchange systems in accordance with the present invention. The getter component is located in the heat exchange system upstream of the aluminum solar panel so as to effectively remove the heavy ions from the aqueous solution before the solution is introduced into the aluminum panel. The getter component is designed in such a manner to be easily removed and subsequently replaced in the heat exchange system. By providing a getter component in the manner described in the present invention, the aluminum solar panel is readily protected from the corrosive heavy metal ions which are present in the heat exchange system at the sacrifice of the getter component.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for removing corrosive heavy metal ions from a fluid heat exchange medium used in a solar energy collector system including at least one heavy metal element and at least one heat exchange panel having passage surfaces of aluminum or aluminum alloy, said method comprising:
   providing a panel type getter, said getter being provided with a passageway having an alloy surface layer of material which has a high affinity for heavy metal ions,
   placing said getter upstream of and in close proximate contact with said heat exchanger, and,
   turbulently passing said heat exchange medium through said getter passageway thereby removing heavy metal ions from said heat exchange medium prior to contact of said ions with said heat exchange panel.

2. The method according to claim 1 wherein said getter passageway is provided with an alloy surface layer containing zinc which contacts said fluid thereby attracting said corrosive heavy metal ions.

3. A method according to claim 1 wherein said getter passageway is provided with an alloy surface layer containing magnesium which contacts said fluid thereby attracting said corrosive heavy metal ions.

4. A method according to claim 1 wherein said getter passageway is provided in a serpentine configuration.

5. A method according to claim 1 wherein said getter passageway is provided in a zigzag configuration.

6. A method according to claim 1 wherein said getter passageway is provided to comprise a unitary expanse which is broken up by a symmetrical pattern of bonded portions.

7. A method according to claim 1 wherein said getter passageway is provided with an alloy surface layer containing cadmium which contacts said fluid thereby attracting said corrosive heavy metal ions.

8. A method for removing corrosive heavy metal ions from a fluid heat exchange medium used in a heat exchange system including at least one heat exchange panel having passage surfaces of aluminum or aluminum alloy, said method comprising:
   providing a panel getter means by placing on a surface of a first sheet of metal a graphite free non-corrosive weld inhibiting material comprising from 5 to 50% by weight zinc powder in a pattern corresponding to a predetermined configuration of a fluid passageway, forming an assembly by superimposing a second sheet of metal upon the surface of said sheet bearing said pattern, pressure welding said assembly by hot rolling the areas thereof not separated by weld inhibiting material, expanding said assembly in the areas separated by said weld inhibiting material by the introduction of pressure therein wherein the weld inhibiting pattern provides a fluid passageway characterized by a high degree of turbulent and non-uniform flow of said fluid,
   placing said panel getter means upstream of said heat exchanger and in close proximate contact therewith, and
   passing said fluid through said panel getter means prior to contact with said heat exchanger,
   whereby said panel getter means, being characterized by having a high affinity for said heavy metal ions in said fluid, effectively removes said heavy metal ions from said fluid prior to contact with said heat exchanger.

9. A method according to claim 8 wherein said fluid passageway is in a serpentine configuration.

10. A method according to claim 8 wherein said fluid passageway is in a zigzag configuration.

11. A method according to claim 8 wherein said fluid passageway comprises a unitary expanse which is broken up by a symmetrical pattern of bonded portions.

12. A method according to claim 8 wherein said graphite free non-corrosive weld inhibiting material comprises from 5–50% by weight cadmium powder.

13. A method according to claim 8 wherein said graphite free non-corrosive weld inhibiting material comprises from 5–50% by weight magnesium powder.

* * * * *